United States Patent [19]

Hardesty et al.

[11] Patent Number: 5,067,933
[45] Date of Patent: Nov. 26, 1991

[54] UNITIZED POWER SYSTEM AND VEHICLES EMPLOYING SAME

[75] Inventors: Lee R. Hardesty, Horicon, Wis.; Izumi Takagi, Akashi, Japan

[73] Assignees: Kawasaki Jukogyo Kabushiki Kaisha, Japan; Deere & Company, Moline, Ill.

[21] Appl. No.: 608,027

[22] Filed: Nov. 2, 1990

Related U.S. Application Data

[63] Continuation of Ser. No. 161,026, Feb. 26, 1988, abandoned, which is a continuation-in-part of Ser. No. 89,146, Aug. 25, 1987, abandoned.

[30] Foreign Application Priority Data

Aug. 28, 1986 [JP] Japan .................. 61-202535

[51] Int. Cl.$^5$ .................................. F16H 47/04
[52] U.S. Cl. ........................ 475/32; 475/83; 60/487
[58] Field of Search ............... 475/32, 83; 60/487

[56] References Cited

U.S. PATENT DOCUMENTS

| 183,081 | 10/1876 | Thayer | 60/487 |
|---|---|---|---|
| 3,122,944 | 3/1964 | Boehner et al. | 74/700 |
| 3,150,543 | 9/1964 | Dangauthier | 74/700 |
| 3,424,032 | 1/1969 | Ritter | 74/730 |
| 3,453,904 | 7/1969 | Dangauthier | 74/664 |
| 3,748,851 | 7/1973 | Hause | 60/19 |
| 4,483,408 | 11/1984 | Yazaki | 180/70.1 |
| 4,627,237 | 12/1986 | Hutson | 60/487 |
| 4,633,961 | 1/1987 | Niskanen | 180/53.7 |
| 4,667,763 | 5/1987 | Nembach | 74/695 X |
| 4,756,208 | 7/1988 | Hayashi et al. | 475/83 |
| 4,862,767 | 9/1989 | Hauser | 475/83 |
| 4,893,524 | 1/1990 | Ohashi et al. | 475/83 |
| 4,903,545 | 2/1990 | Loub et al. | 475/83 X |
| 4,942,780 | 7/1990 | Fujisaki et al. | 475/83 |

FOREIGN PATENT DOCUMENTS 102472 2/1926 Austria .................. 60/487
59-87324 6/1984 Japan .

Primary Examiner—Dirk Wright
Attorney, Agent, or Firm—Leydig, Voit & Mayer

[57] ABSTRACT

A unitized power system and an off road vehicle including such power system are provided comprising an engine having a crankshift; a drive train operatively connected to the engine, the drive train including a variable speed transmission and a driving axle arrangement; and a housing enclosing the drive train and at least a portion of the engine. The variable speed transmission transmits power from the output end of the crankshaft of the engine to driven shafts of the vehicle.

Preferably, the unitary housing is provided for encasing all of the output end of the crankshaft of the engine. The variable speed transmission preferably also includes a variable hydraulic pump for converting the engine power into hydraulic pressure, a crescent hydraulic motor for converting the hydraulic pressure into driving power, a reduction gear for reducing the driving power, a differential gear for transmitting the reduced driving power to the driven shafts, and the driven shafts. The housing includes a lower casing portion fixed to a crankcase of the engine, a pump cover portion for encasing the variable hydraulic pump, and an axle housing portion for encasing the crescent hydraulic motor, reduction gear, and differential gear, the portions being fixedly connected to each other to form a unitary body.

46 Claims, 11 Drawing Sheets

UNITIZED POWER SYSTEM AND VEHICLES EMPLOYING SAME

This application is a continuation of U.S. Pat. application Ser. No. 07/161,026, filed Feb. 26, 1988 and now abandoned which is a continuation-in-part of prior U.S. Pat. application Ser. No. 089,146, filed Aug. 25, 1987 and now abandoned.

BACKGROUND OF THE INVENTION

The present invention relates to a power system used for vehicles operated generally from a sitting position, such as small three-wheeled or four-wheeled vehicles. More particularly, it relates to a variable speed transmission for producing a variable speed by utilizing oil pressure, to power systems which include a unitized combination of an engine and drive train, and to vehicles employing such transmission or combination.

Most larger motor vehicles intended for use as passenger vehicles or for performing certain work functions, such as automobiles, motorcycles, buses, trucks, etc., are provided with power trains which permit the vehicle to maintain a constant velocity while the engine speed is varied to accomplish this purpose. However, in smaller dedicated vehicles which are intended to perform a work function, such as rear engine riders, lawn tractors, front mounted mowers, etc., it is preferred that the engine maintain a constant speed while the vehicle speed varies. This relationship is preferred because, in such vehicles, which generally operate at a relatively slow speed, the work-performing device is connected, either directly or indirectly, to the output end of the crankshaft of the vehicle. Optimum performance of the work-performing device is achieved within a certain rpm range and generally when the power takeoff (hereinafter referred to as PTO) or output end of the crankshaft is rotating at a relatively constant speed. When terrain varies, therefore, a constant vehicle speed is sacrificed for a constant engine speed. This may be accomplished by some form of variable speed transmission.

In a vehicle of conventional design such as, for example, a small four-wheeled cart or buggy as shown in FIG. 1, an engine 10 is arranged in such a way that a crankshaft (output shaft) of the engine extends vertically. Power generated by the engine 10 is transmitted to a trans-axle 16 and a working apparatus such as a lawn mower 18 by means of V-shaped belts 12 and 14, respectively. A driving axle arrangement (not shown) for controlling a variable speed by utilizing oil pressure is incorporated into the trans-axle 16, and rear wheels 19 are rotatably mounted on both ends of the trans-axle 16.

However, in a variable speed transmission comprising the trans-axle 16 and the V-shaped belt 12 used in the four-wheeled buggy as shown in FIG. 1, since the V-shaped belt 12 is twisted in its path, the durability of the V-shaped belt 12 is reduced. Further, in the above variable speed transmission, since the engine 10 and the trans-axle 16 are connected to each other by means of the V-shaped belt 12, the trans-axle 16 cannot be supported floatingly on a chassis of the vehicle and the V-shaped belt 12 tends to become misaligned. Accordingly, it is necessary in the above-described variable speed transmission to use a so-called "rigid axle" in which the trans-axle 16 is rigidly fixed to the vehicle chassis. Further, in the above-described variable speed transmission, since a hydro-static transmission is incorporated into the trans-axle 16 independently of the engine, there is, in many instances, the disadvantage that the temperature of the working oil in the hydro-static transmission is drastically elevated.

Further, in relation to such variable speed transmission, a multiple axis trans-axle has been proposed as described in the Japanese Utility Model Laid-Open No. 87324/1984. However, in the multiple axis trans-axle, since the trans-axle has a plurality of axes, the trans-axle itself is of a large size, thereby requiring a large space for accommodating the trans-axle on the vehicle.

Thus, there is a need for a unitized power system for a vehicle. Preferably, the power system is compact and includes an engine and drive train enclosed in a common housing. A need also exists for a power system which is floatingly supported and eliminates the use of a belt between the engine and transaxle. Vehicles now available also want for a single oil tank or sump which provides oil to the engine and/or the trans-axle as a lubricating oil and to the transmission as an hydraulic fluid.

SUMMARY OF THE INVENTION

The present invention is directed to a variable speed transmission for transmitting power from an output end of the crankshaft of an engine mounted on a vehicle to driven shafts arranged transversely of the vehicle and to a combination of such engine and a driving train which includes a transmission and a drive axle arrangement as a single unit contained within a common housing. The combination of an engine and a drive train is referred to herein as a power system. More specifically, a preferred unit includes an engine; a housing fixedly connected to the engine body and encasing the output shaft or output end of the crankshaft and the driven shafts such as those shafts driven by the output shaft or crankshaft; an hydraulic pump which can be externally controlled to adjust the amount of oil discharged therefrom by an operator and which is connected to the output end of the crankshaft and encased in the housing; and a driving axle arrangement including a hydraulic motor for converting oil pressure from the hydraulic pump into driving power, a reduction gear for reducing an output speed of the hydraulic motor, and a differential gear for transmitting the reduced output speed from the reduction gear to separated shafts comprising the driven shafts extending transversely of the vehicle, which is connected to said separated shafts and is encased by the housing means.

With the above-mentioned constructions, since the hydraulic pump and the driving axle arrangement are accommodated in the housing as a unit, there is no need for using a V-shaped belt for transmitting the engine power and, even when the driving axle is floatingly supported on the vehicle, there occurs no problem.

The preferred unitized power systems of the present invention are expected to have widespread application in vehicles in which a dedicated work function is performed, such as off road vehicles. These vehicles typically require a variable transmission speed which permits the vehicle speed to vary within a range but the engine speed to remain substantially constant, thereby permitting a constant speed to a PTO. Examples of the types of vehicles in which the present invention is employed include front mounted mowing machines, riding mowers, rear engine riders, small general purpose vehicles or carts, engine powered lawn and garden maintenance equipment, engine powered recreational equipment, golf carts, golf course care equipment, lawn tractors, all terrain vehicles, and the like.

The engine which forms an element of the claimed invention may take the form of a number of different embodiments, including both liquid- and air-cooled engines. Such embodiments include those employing different types of "fuel," such as gasoline and diesel powered engines and continuous electric motors, those varying in the number and arrangement of the cylinders, such as single-cylinder engines, in-line, and V-configuration multicylinder engines, and rotary engines, 2-cycle engines, and 4-cycle engines.

The transmission and power system of the present invention may be used with front wheel, rear wheel, and four wheel drive vehicles.

In addition to those advantages of the present invention noted above, the power systems described herein provide a number of other features distinguishing them from conventional systems. In particular, the power systems of the present preferred invention are easily assembled into self-contained units of a compact size which may be readily installed in vehicles such as those described above. This permits a lower manufacturing cost of such vehicles. In addition to the compact size, the power systems of the present invention also have lower centers of gravity which allow increased stability of the vehicles on slope. The vehicles also have lower vibration levels and lower noise levels because of a single housing and the isolation of the power system unit from the chassis as a rigid unit which concentrates the mass of the unit. Furthermore, control of dimensional tolerance is better and engines having different sizes and power ratings may be used. Finally, the unitized combination of engine, transmission, and trans-axle afforded by the present invention permits the reduction of manufacturing costs and moving parts (i.e., fewer bearings and shafts are required as compared to conventional systems).

The compactness of the power systems of the present invention results from both the combination comprising a unitized engine and drive train employing a common housing and preferably by employing an hydro-static transmission and by including an hydraulic motor which surrounds the rear axle.

Manufacturing costs may also be additionally reduced and other advantages realized by employing, in a power system which uses a common housing for the engine and drive train or for a conventionally connected engine and drive train a single oil source, that is, a single oil tank or sump to provide oil to at least one of the engine and the trans-axle as a lubricant and to the oil pump and transmission as a hydraulic fluid. These construction additionally allow for easier maintenance and, in some cases, better cooling of the oil.

The primary object of the present invention is to eliminate the above-mentioned drawbacks of the conventional variable speed transmission by providing an improved variable speed transmission in which a trans-axle of the transmission or a unitized engine and drive train can be supported floatingly on a vehicle chassis. Additional objects include the provision of a combination of an engine and a drive train arranged as a compact unit as well as a vehicle employing such unitized combination and the use of fluid from a single tank for the transmission and for the engine and/or the trans-axle.

Other objects and advantages of the present invention will be apparent from the following description, accompanying drawings and the appended claims.

DETAILED DESCRIPTION OF THE PREFERRED EMBODIMENTS

Figure 2:
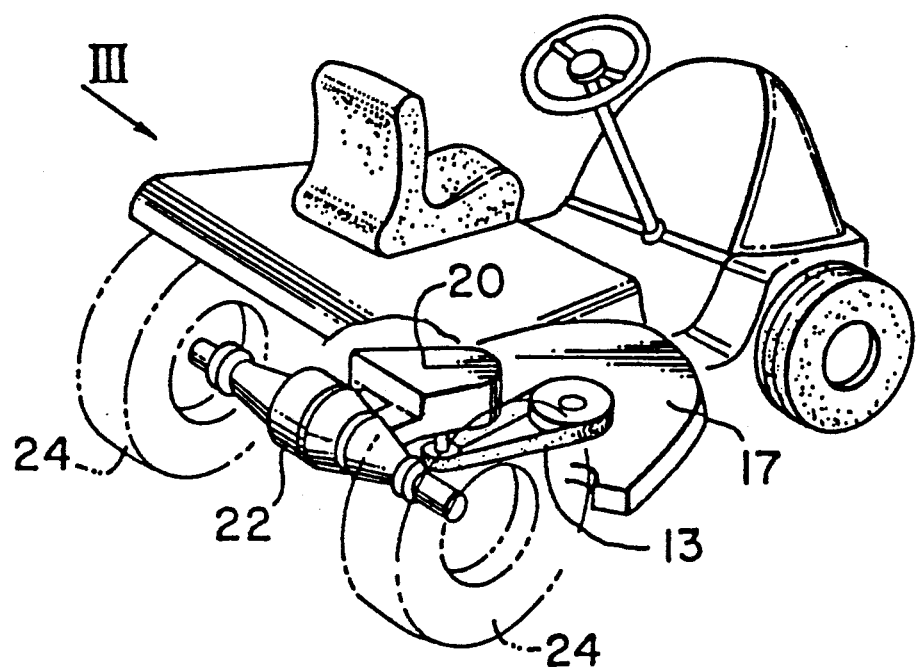
FIG. 2 is a perspective view of a four-wheeled vehicle incorporating the engine and power train according to the present invention.

The present invention will now be explained with reference to the drawings. In a preferred embodiment shown in FIGS. 2 to 4, the variable speed transmission according to the present invention is adapted to a small four-wheeled vehicle intended to perform a dedicated work function, in this instance, mowing. However, it should be noted that the present invention is not limited to the type of four-wheeled vehicles illustrated, but can be adapted to any vehicle, and particularly those in which the engine is intended to turn at substantially a constant rate of speed while the speed of the vehicle varies. In FIG. 2, an engine 20 is mounted on the four-wheeled vehicle in such a way that a crankshaft or output end of the crankshaft of the engine (not shown in FIG. 2) extends vertically. A trans-axle 22 is preferrably integrally connected to the engine 20. Power generated by the engine is transmitted to rear wheels 24 through the trans-axle 22. Further, the power from the engine is also transmitted to a working apparatus such as a lawn mower 17 by the medium of a V-shaped belt 13.

Figure 3:
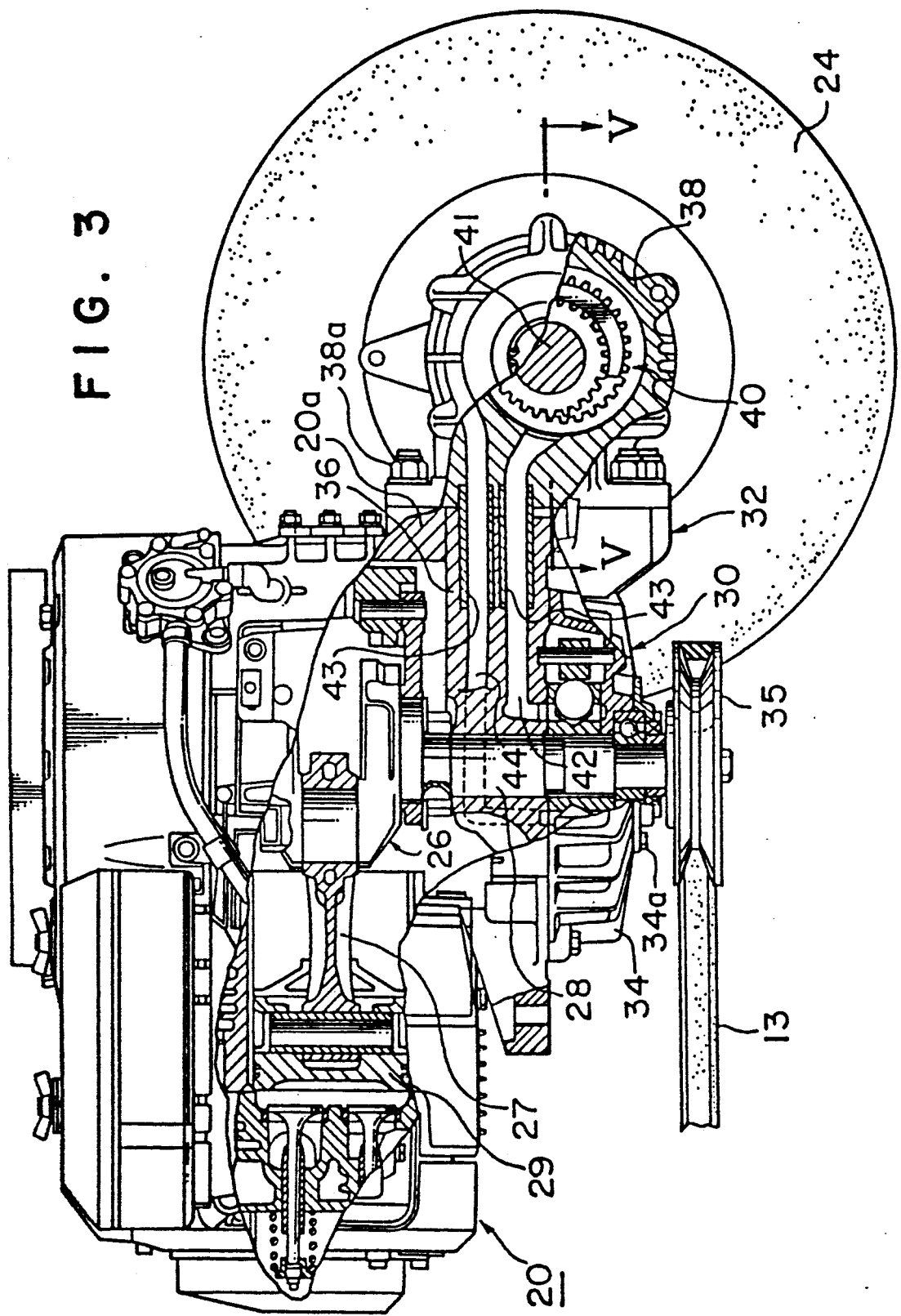
FIG. 3 is a partial cut-away view of an engine and a trans-axle, mounted on a vehicle viewed from a direction of an arrow III of FIG. 2.
Figure 12:
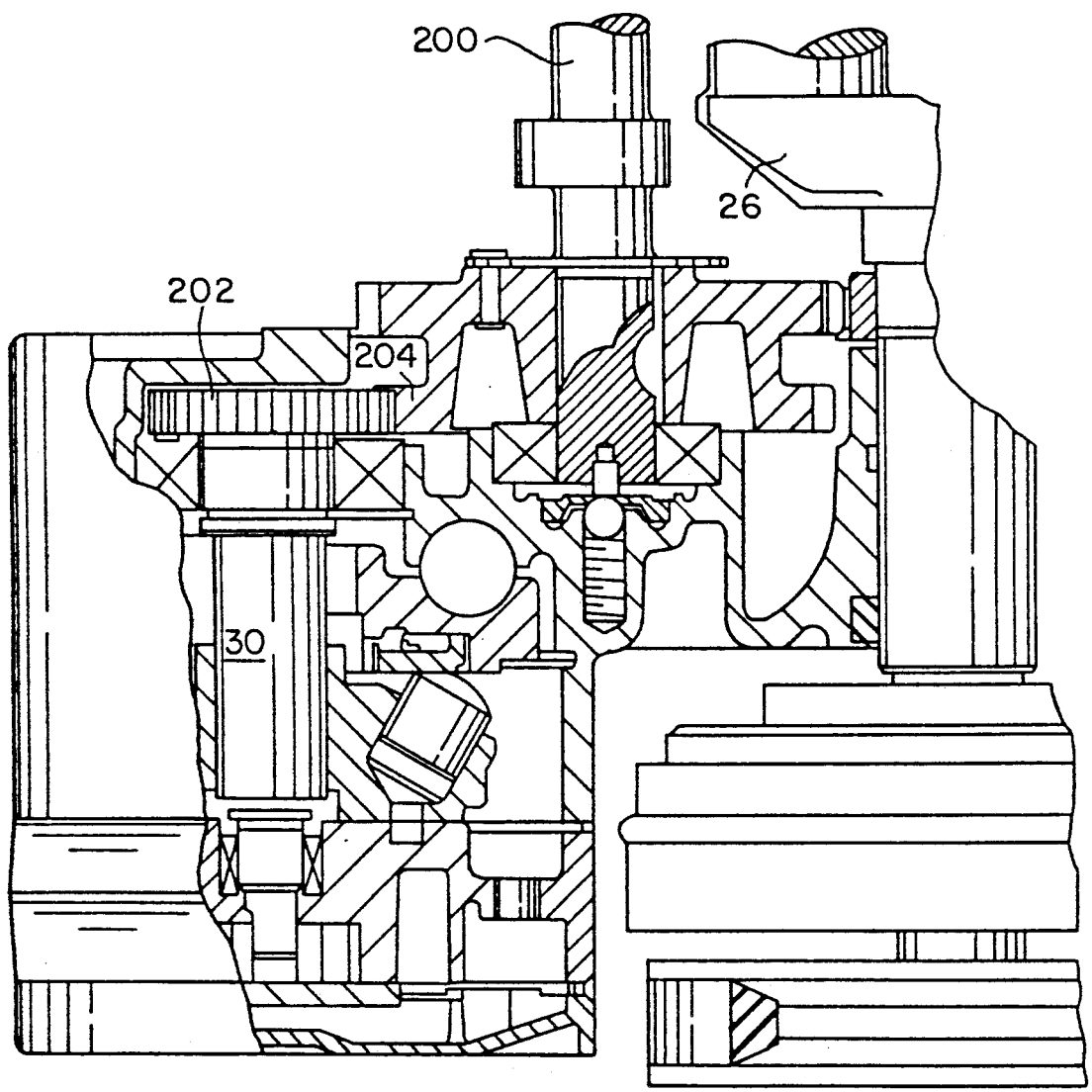
FIG. 12 is a partial cut-away view of an embodiment of the present invention showing the relationship between the crankshaft, camshaft, and hydraulic pump.

More particularly, as shown in FIG. 3 which is a partial cut-away view of an embodiment of the power train of the present invention, specifically, of the engine 20 and the trans-axle 22 viewed from the direction of an arrow III of FIG. 2, a piston 29 is connected to the crankshaft 26 of the engine 20 by means of a connecting rod 27. An hydraulic pump 30 is operatively connected to output means associated with the crankshaft 26, such as arranging the pump around an output end portion 28 of the crankshaft 26. As an alternate embodiment shown in FIG. 12, the hydraulic pump 30 may be operatively connected to the cam shaft 200 with, for example, a gear 202 located on the cam shaft engaging a gear 205 on the pump. The preferred hydraulic pump, and that employed in the embodiments illustrated in the figures, is a variable hydraulic pump. However, other types of hydraulic pumps may be used, such as hydraulic piston and gear gerotor pumps. The pump 30 is surrounded by a pump cover 34 which forms a part of a housing 32, as will be fully described hereinbelow. Further, the output end portion 28 of the crankshaft 26 is provided at its lower end with a PTO shaft, which serves as a means to transmit rotational motion. The PTO may take a variety of forms and applications, such as a universal joint, propeller shaft, clutching mechanism (as, for example, an electric or hydraulically actuated clutch) sprocket, and the like or, as specifically illustrated in FIG. 3, a pulley 35, around which the V-shaped belt 13 is entrained. Thus, the power generated by the engine 20 can be transmitted to the lawn mower 17 (FIG. 2) through the medium of the output shaft portion 28, pulley 35, and the V-shaped belt 13.

The housing 32 comprises the above-mentioned pump cover 34, a lower casing 36, and an axle housing 38 which are integrally connected to each other. More particularly, although most or all of the housing components may be formed as a single housing unit, because of manufacturing considerations, it is preferred that the lower casing 36 be connected or fixed to a bottom surface of a crankcase 20a of the engine 20 by means of bolts (not shown). In addition, the pump cover 34 is connected or fixed to the lower casing 36 by means of a plurality of bolts 34a, and the axle housing 38 is connected or fixed to side surfaces of the crankcase 20a and the lower casing 36 by means of a plurality of bolts 38a.

A motor 40, preferably an hydraulic motor, is housed within the axle housing 38. The preferred hydraulic motor, and that employed in the embodiments illustrated in the figures, comprises a crescent hydraulic motor. However, other types of hydraulic motors may be used, such as hydraulic piston and gear gerotor motors. Particularly preferred are hydraulic motors which surround the rear axle, as does the crescent hydraulic motor illustrated. This hydraulic motor 40 forms a part of a driving axle arrangement which will be fully described hereinbelow, and imparts rotational movement to each of separated axles or shafts 41. On outer ends of the separated shafts 41, the corresponding rear wheel tires 24, typically having a large diameter, low pressure, and good cushioning ability, are mounted. Further, the crescent hydraulic motor 40 communicates with the variable hydraulic pump 30 through the medium of working or hydraulic oil passages 42 and 44 which are formed in walls of the lower casing 36 and the axle housing 38. Inner conduits, such as tubes or pipes, 43 are arranged in the passages 42 and 44 at a junction between the lower casing 36 and the axle housing 38. Alternatively, the pipes 43 may be provided externally of and between the lower casing and axle housing, as discussed below.

Figure 4:
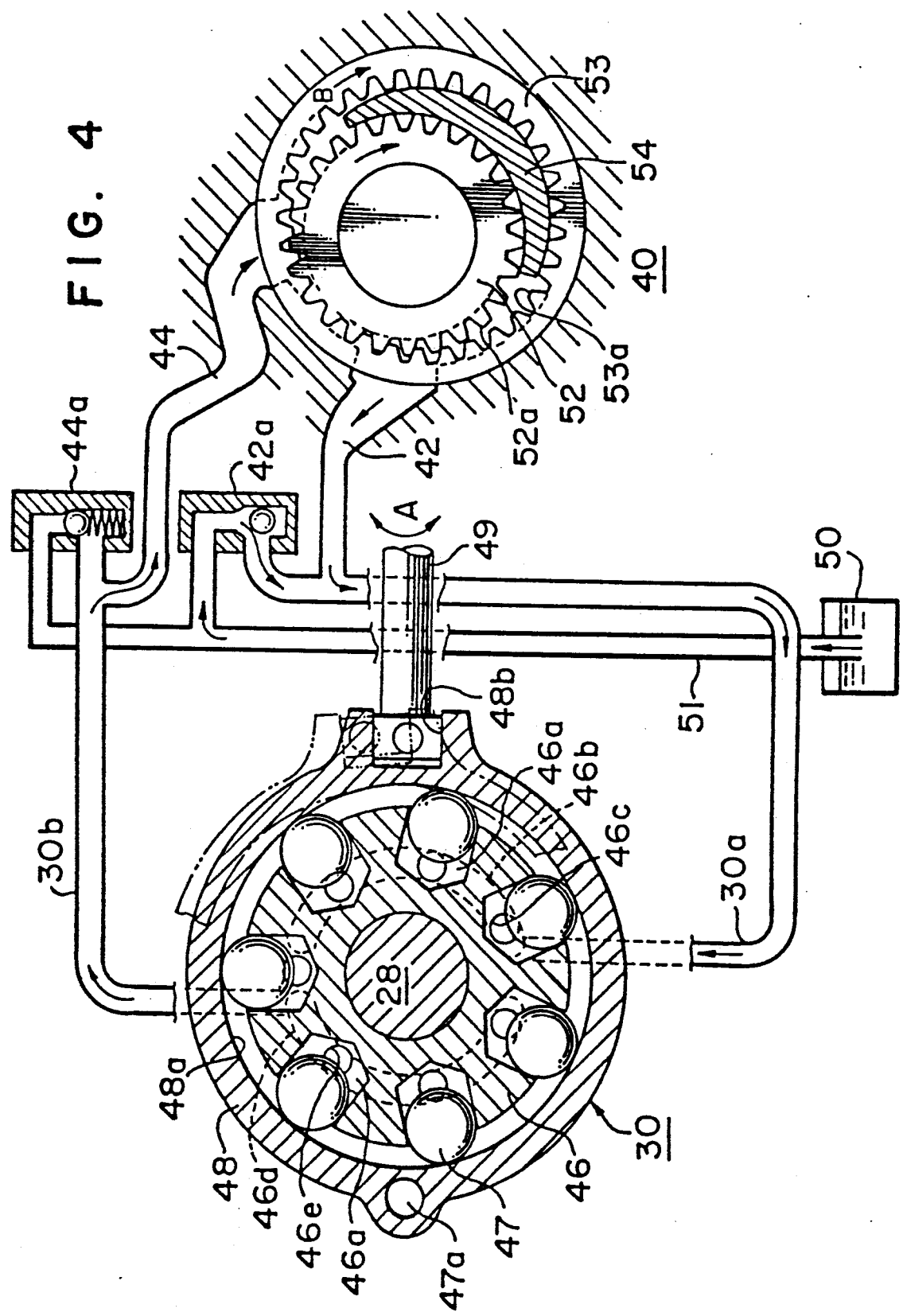
FIG. 4 is a fragmental sectional view showing the relationship between a variable hydraulic pump and a crescent hydraulic motor of a transmission according to the present invention.

A variable speed transmission, preferably a hydrostatic transmission (referred to as HST hereinafter) as described above may be employed. Alternatively, a continuously variable transmission may be used. The preferred HST comprises an hydraulic pump and an hydraulic motor, in this embodiment, the variable hydraulic pump 30 and the crescent hydraulic motor 40. FIG. 4 shows the construction of such HST. Because of the arrangement of the crescent hydraulic motor 40 surrounding the separated axles or shafts 41, the motor may be appropriately considered as either a component of the HST or of the driving axle arrangement, as discussed below.

In FIG. 4, the variable hydraulic pump 30 is constituted by a cylinder block 46, a plurality of ball pistons 47, and a cam ring 48 surrounding the ball pistons. The ball pistons 47 are slidably arranged in corresponding oil chambers 46a which are formed along the periphery of the cylinder block at equidistant intervals and which extend radially and outwardly of the cylinder block opening to the outside. The cam ring 48 which surrounds the ball pistons 47 is rockably supported on a pin (the receiving hole 47a for which is shown in FIG. 4) fixed to the pump cover 34 and lower casing 36 (FIG. 3). The ball pistons 47 are slidably engaged by a cam surface 48a of the cam ring 48. When the cylinder block 46 is rotated by the output shaft portion 28 of the crankshaft 26, which is fixed to a central opening of the cylinder block 46 by an appropriate means such as a press fit, the ball pistons 47 are reciprocated in the corresponding oil chambers 46a in such a way that oil introduced into each oil chamber 46a from an inlet conduit 30a is discharged from the chamber through an outlet conduit 30b. To this end, the inlet conduit 30a communicates with the oil chambers 46a by means of an arcuate passage 46b and ports 46c, and the outlet conduit 30b communicates with the oil chambers 46a by means of an arcuate passage 46d and ports 46e.

An adjustment rod 49 for adjusting the amount and direction of oil discharged from the oil chambers 46a is fixedly mounted in a recess 48b formed in a right-hand end (FIG. 4) of the cam ring 48. By shifting the adjustment rod 49 in a direction as shown by an arrow A, the cam ring 48 is rocked or rotated around the pin 47a, thereby adjusting the degree of reciprocal movement of each ball piston 47 and, accordingly, the amount of oil discharged from the variable hydraulic pump 30.

The outlet conduit 30b is connected to the hydraulic oil passage 44 (FIG. 3), and the inlet conduit 30a is connected to the hydraulic oil passage 42. Therefore, the pressurized oil discharged from the variable hydraulic pump 30 is supplied to the crescent hydraulic motor 40 through the outlet conduit 30b and the hydraulic oil passage 44 and is returned to the variable hydraulic pump 30 through the hydraulic oil passage 42 and the inlet conduit 30a. Accordingly, the oil circulation system includes the pump 30, the outlet conduit 30b, the hydraulic oil passage 44, the motor 40, the hydraulic oil passage 42, and the inlet conduit 30a. A suction conduit 51 for sucking oil from an oil tank 50 of the engine 20 is connected to the hydraulic oil passages 44 and 42 through the medium of check valves 44a and 42a, respectively.

The crescent hydraulic motor 40 includes an inner ring gear 52 fixed to one of the separated shafts 41 (FIG. 3), an outer ring gear 53 having an inner gearing 53a meshed with an outer gearing 52a of the inner gear 52, and an arcuate partition member 54 for dividing an oil chamber defined by the inner gearing 53a and the outer gearing 52a into two separate compartments. When oil flow occurs in the direction shown by the arrows in oil passages 42 and 44, the inner ring gear 52 and the outer ring gear 53 are rotated in the direction shown by an arrow B by means of the pressurized oil supplied from the hydraulic oil passage 44 in a conventional manner. The crescent hydraulic motor 40 itself can be reversed by changing the direction of flow of the oil in the hydraulic oil passages 44 and 42, thereby permitting a rearward drive. This occurs when the adjustment rod 49 is moved from a first position in which the rod is staggered or askew with respect to (i.e., on one side of) the midpoint in its path of motion to the other side of the midpoint. Movement of the rod 49 from an outer limit toward the midpoint of its path also causes a decreased rate of flow of the oil and concomitant angular deceleration of the ring gears 52, 53, and shafts 41.

Figure 5:
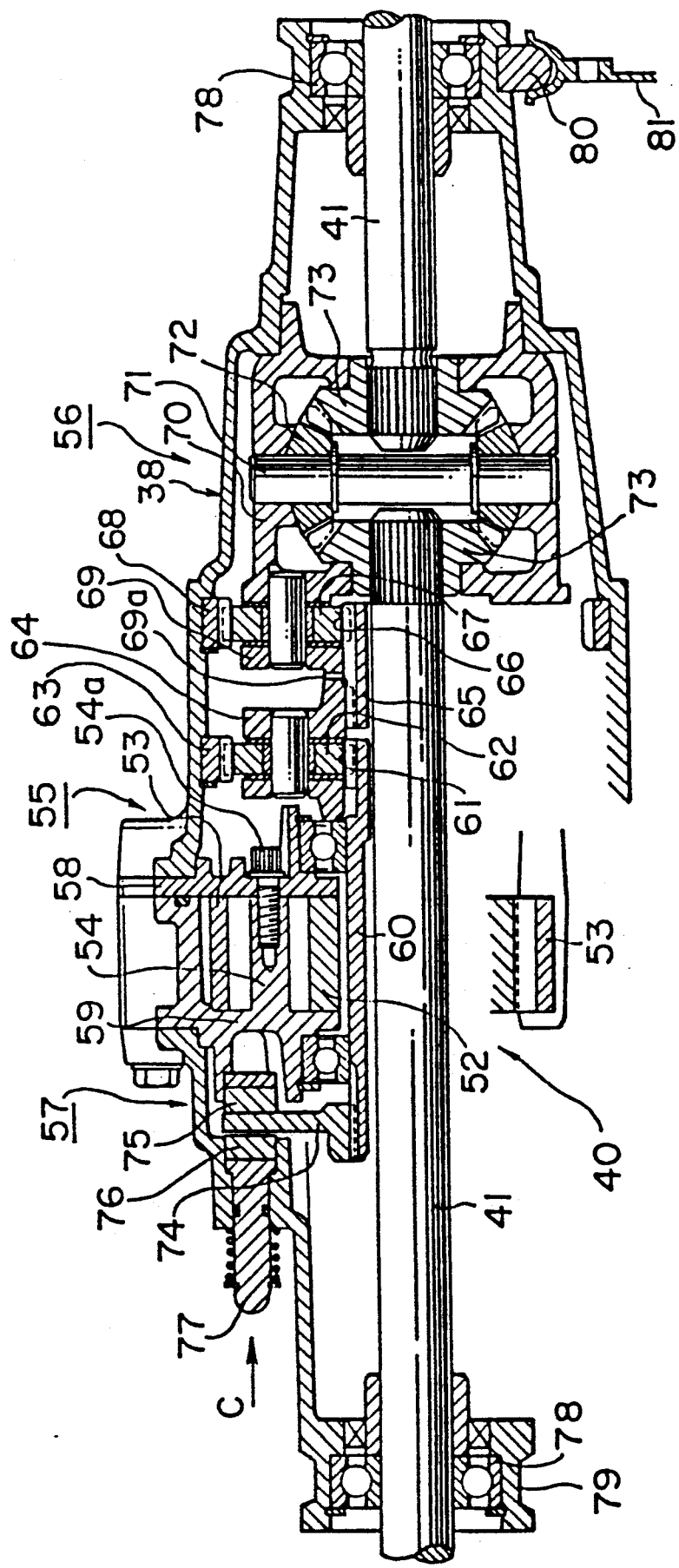
FIG. 5 is a sectional view taken along the line V—V of FIG. 3.

The driving axle arrangement provided around the separated shafts 41 may be explained with reference to FIG. 5 which is a sectional view taken along the line V—V of FIG. 3. In FIG. 5, arranged around the left-hand side separated shaft 41, are the crescent hydraulic motor 40, a planetary gear reduction 55, a differential gear 56, a brake 57, and other elements, these elements being encased by the axle housing 38.

The partition member 54 of the crescent hydraulic motor 40 is fixed to a side cover 58 forming a part of the axle housing 38 by means of bolts 54a. Further, the partition member 54 is integral with a motor housing 59 connected to the axle housing 38. The inner ring gear 52 of the crescent hydraulic motor 40 is connected, by a spline connection, to a tubular output shaft 60 arranged around and spaced apart from the separated shaft 41. On the right-hand end (FIG. 5) of the tubular output shaft 60, there is provided a sun gear 61 which engages a planetary gear 62 of the planetary gear reduction 55. The planetary gear 62 is also engaged, at its outer portion, by a ring gear 63 fixed to the axle housing 38 and is supported by a carrier 64 connected to a tubular shaft 65 by a spline connection.

A sun gear 66 is formed on the right-hand end of the tubular shaft 65, which sun gear 66 is engaged by a planetary gear 67. The planetary gear 67 is also engaged, at its outer portion, by a ring gear 68 fixed to the axle housing 38 and is supported by a carrier 69. The carrier 69 is in slidable contact with the carrier 64, between which a lubricant oil passage 69a is formed.

The carrier 69 is integral with a differential case 70 into which a center pin 71, differential pinions 72 mounted on the center pin, and differential side-gears 73 meshed with the differential pinions are accommodated. The left-hand and right-hand side-gears 73 are connected to the corresponding separated shafts 41 by spline connections, respectively.

With the above-mentioned construction, a driving power generated by the crescent hydraulic motor 40 can be decreased or decelerated by the planetary gear reduction 55 and then be transmitted to the separated shafts 41 (on which the rear wheels 24 are mounted) by means of the differential gear 56.

A brake disc 74 is arranged around the left-hand end portion of the tubular output shaft 60 and is connected thereto by means of a spline connection. A brake pad 75 is positioned to face the right side surface of the brake disc 74. On the left side of the brake disc 74, there is provided a push rod 77 having a brake pad 76 in such a way that the brake pad 76 faces the left side surface of the brake disc. When the push rod 77 is urged in a direction shown by an arrow C, a braking force is generated to stop the rotational movement of the separated shafts 41. This brake arrangement may be employed for dynamic braking to slow the vehicle or as a parking brake. Thus, alternate means are provided to slow the vehicle, either with the braking arrangement just described or by adjusting the variable hydraulic pump 30 with the rod 49.

The separated shafts 41 are rotatably mounted at their outer ends on the axle housing 38 through the medium of bearings 78. Annular elastic (rubber) insulators 80 (only one of which is partially shown in FIG. 5) are positioned in corresponding annular grooves 79 formed in the axle housing 38. Further, the insulators 80 are supported by side frames 81 which form a part of the vehicle chassis. Therefore, the axle housing can be floatingly supported on the side frames 81 by the shock absorbing elasticity of the elastic insulators 80.

The operation of the variable speed transmission according to the present invention may be explained with reference to FIG. 3. With the above-mentioned construction, as shown in FIG. 3, because the axle housing 38, rotatably supporting the separated shafts 41, is fixedly connected to the lower casing 36 and to the crankcase 20a, and since the pump cover 34 encasing the variable hydraulic pump 30 is also fixedly connected to the lower casing 36, even when the axle housing 38 is floatingly supported by the elastic insulators 80 (FIG. 5) on the vehicle chassis, the engine 20 and the variable hydraulic pump 30 can be moved together with the axle housing 38 as a unit.

Figure 1:
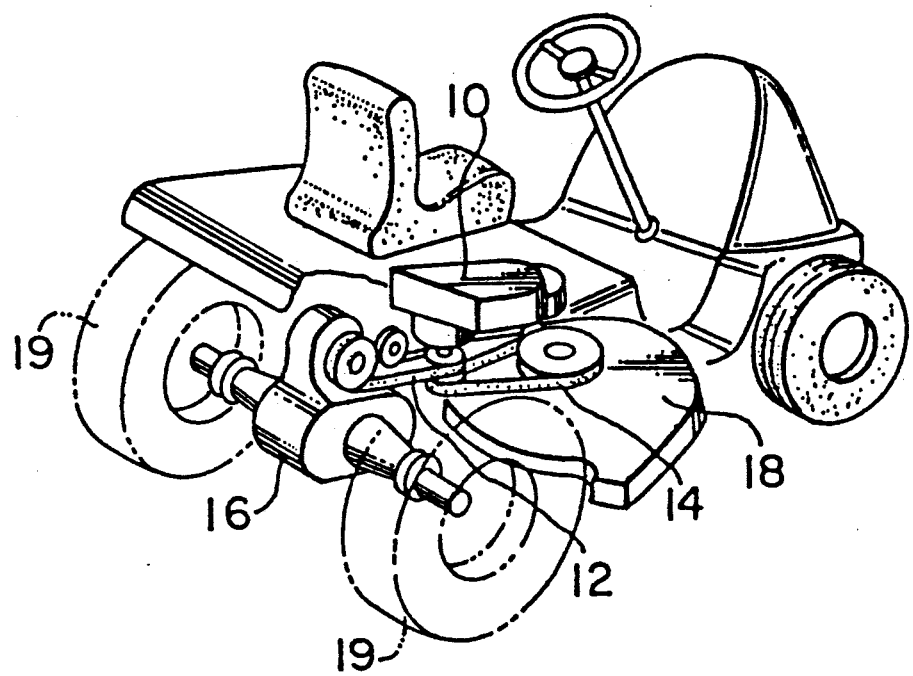
FIG. 1 is a perspective view of a four-wheeled vehicle incorporating a variable speed transmission of a conventional design.

Therefore, according to the present invention, there is no need for inclusion of a V-shaped belt 12 for transmitting the power from the engine 10 to the trans-axle 16 as in the case of the transmission shown in FIG. 1; on the contrary, in the present invention, the power generated by the engine 20 is converted into hydraulic pressure by means of the variable hydraulic pump 30, and the hydraulic pressure is transmitted, through the hydraulic oil passages 42, 44, to the crescent hydraulic motor 40 (FIG. 4) and is converted into driving power by the crescent hydraulic motor 40. The driving speed from the crescent hydraulic motor 40 is decreased or decelerated by the planetary gear reduction 55 and then transmitted to the separated shafts 41 through the medium of the differential gear 56.

The driving axle arrangement constituted by the crescent hydraulic motor 40, the planetary gear reduction 55, the differential gear 56, the brake 57, and the like is accommodated by the axle housing as a unit, thus making the axle housing 38 compact.

Furthermore, as shown in FIG. 4, the working oil or hydraulic fluid circulating between the variable hydraulic pump 30 and the crescent hydraulic motor 40 may be a portion of the lubricating oil used to lubricate the engine and/or the driving axle arrangement which is contained or reserved in the oil tank or sump 50. Thus, heat due to friction generated by the crescent hydraulic motor 40 is cooled by the oil which is transferred to the oil tank 50 having an excellent radiating ability. This prevents overheating of the working oil for the variable hydraulic pump 30 and the crescent hydraulic motor 40.

In addition to using the common sump to provide lubricating oil to the engine and/or the driving axle arrangement and to supply oil as an hydraulic fluid to an hydraulic system to operate the hydraulic pump and hydraulic motor, the sump may be included in a larger hydraulic system to activate mechanisms, such as lift cylinders to operate mechanical devices. Examples of such devices include post-hole diggers, log splitters, and the like.

The viscosity of the oil used with the variable hydraulic pump 30 and the crescent hydraulic motor 40 is preferred to be higher than what may be required for the lubricating oil for the engine 20. Preferably, in the variable speed transmission according to the present invention, the so-called "multi-grade oil" having a wide viscosity range is used as the lubricating oil for the engine 20, and this lubricating oil is also used as the working oil for the variable hydraulic pump 30 and the crescent hydraulic motor 40.

It should be noted that the present invention is not limited to the embodiment illustrated and described above. For example, in place of the embodiment of FIG. 3 wherein the axle housing 38 is fixedly connected to the lower casing 36 and the crankcase 20a by means of the bolts 38a, the axle housing 38 can be separated from the lower casing 36 by connecting them by means of any flexible hydraulic hose or rigid tubing (not shown) thus providing the working oil passages (44, 42). In this case, the mass of the axle housing 38 is supported by the elastic insulators 80 (FIG. 5) and, accordingly, the total mass supported by a spring force is decreased, and the vibration of the engine is not transmitted to the axle housing.

Unlike the first embodiment of the present invention illustrated in FIGS. 2 to 5, which is a rear axle or rear wheel-powered device and the power system employed therefor, the vehicle and a second embodiment of the power system illustrated in FIGS. 6 to 11 are intended primarily for use in a front axle or front wheel-powered vehicle. Other than the orientation of the power system of FIGS. 6 to 11, and several other variants, this embodiment is similar to that illustrated in FIGS. 3 to 5. Like reference numerals are employed in describing the elements of the second embodiment which are similar to those of the first embodiment of FIGS. 2 to 5. The description below is directed to those features either not shown in FIGS. 2 to 5 or which are different from the first embodiment.

Figure 6:
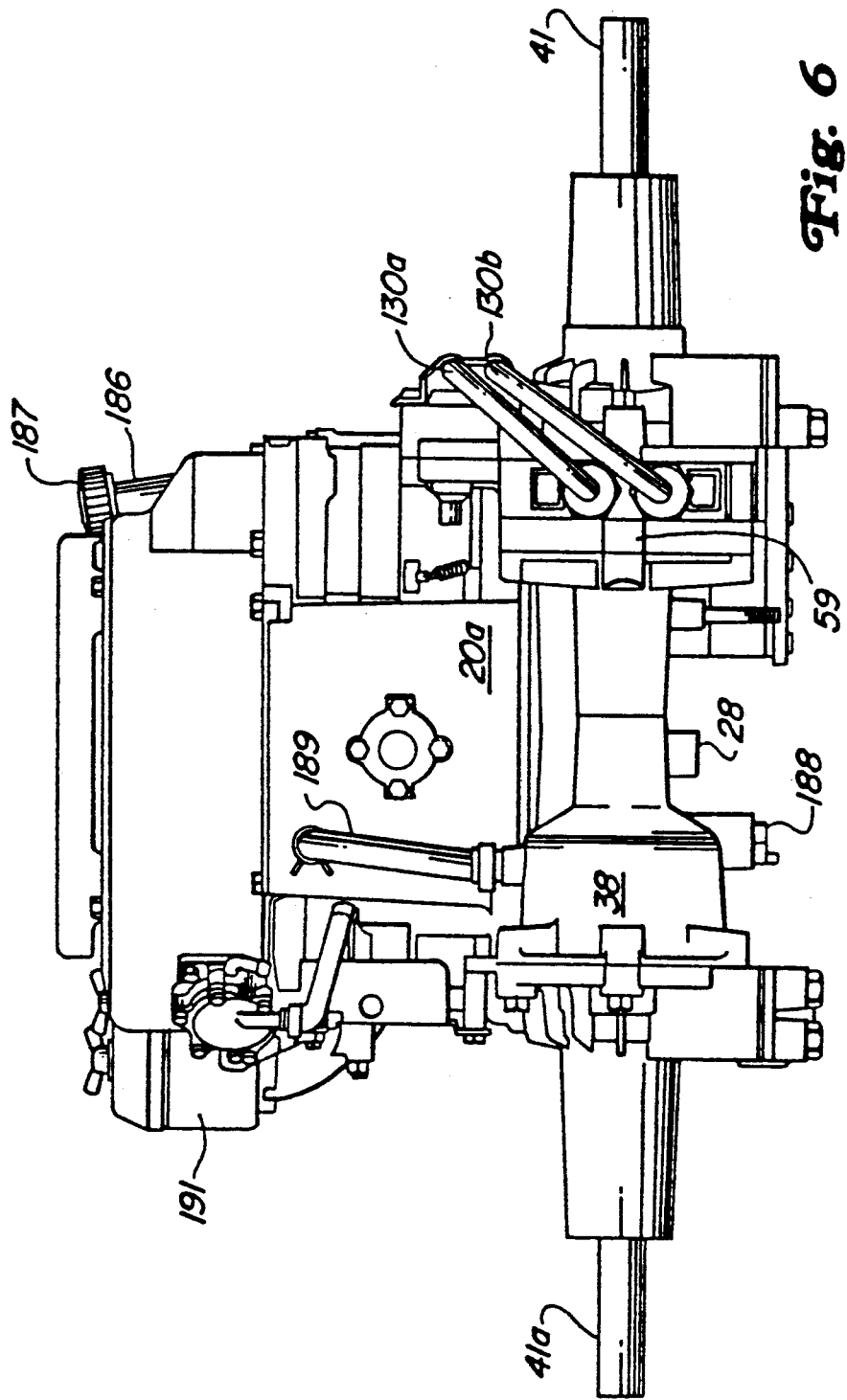
FIG. 6 is a front view of a second embodiment of the power system according to the present invention.
Figure 8:
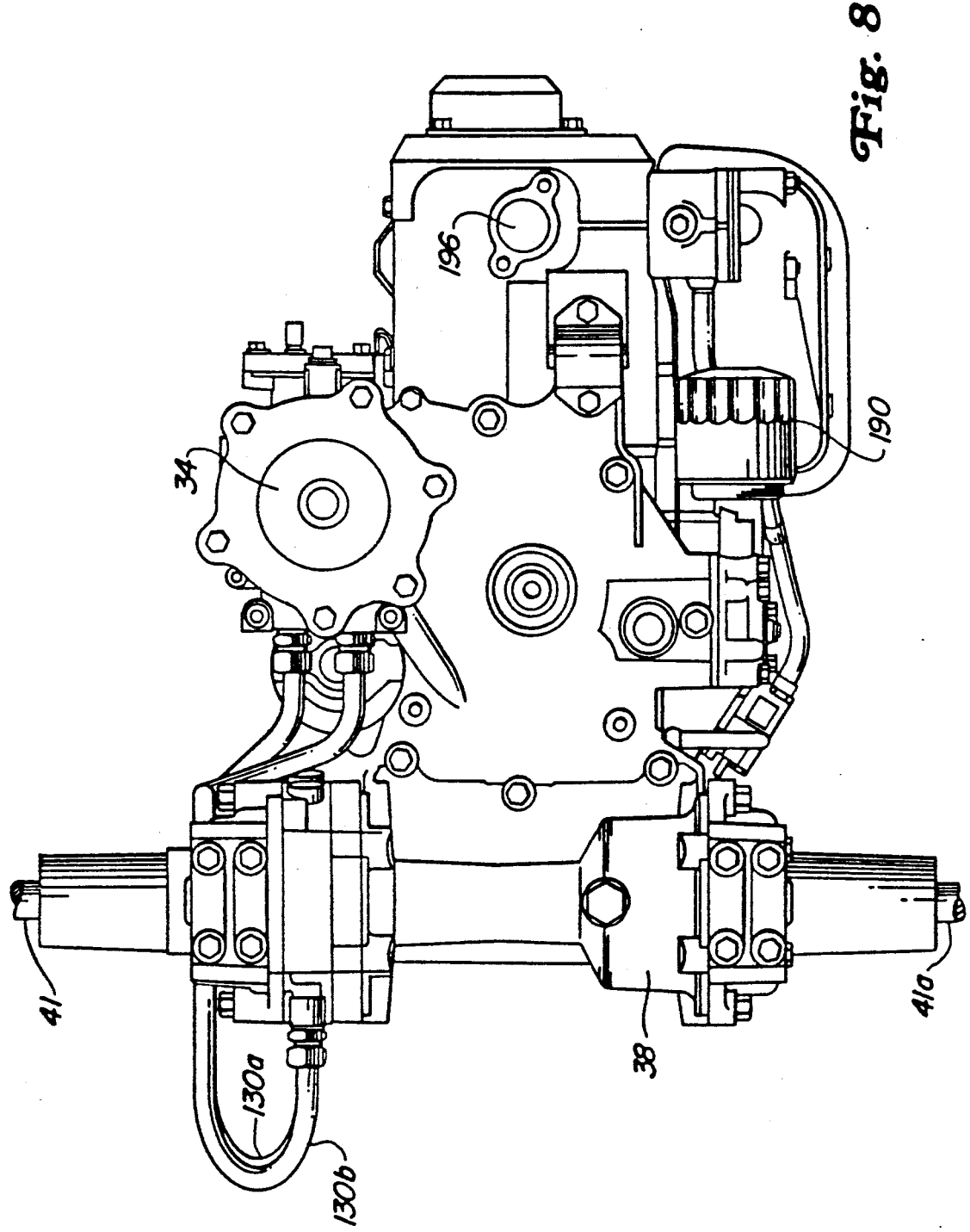
FIG. 8 is a bottom view of the second embodiment.

FIG. 6 illustrates a front view of the power system for a front mounted mower which includes an air-cooled engine and drive train. Rather than employing the internal oil passages, pipes, and conduits of the first embodiment of FIGS. 2 to 5, the second embodiment employs external conduits 130a and 130b to transfer hydraulic fluid between the variable hydraulic pump 30 and the crescent hydraulic motor 40. As best illustrated in FIGS. 8, 9, 10, and 11, illustrating respectively a bottom view, right side view, top view, and left side view of the unitized power system, lubricating oil, serving as an hydraulic fluid, is transferred between the variable hydraulic pump cover 34 or pump housing 197 and a motor housing 59. To introduce lubricating oil/hydraulic fluid to the power system, an oil filler tube 186 and oil filler tube cap 187 are provided. To determine the volume of oil in the system, a dipstick (not shown) is affixed to the inside of the oil filler tube cap. To remove oil from the system an oil drain plug 188 is provided in the bottom of the axle housing 38 (FIGS. 6 and 8). To transfer vapors between the engine crankcase 20a and the axle housing 38, a conduit, such as rubber tubing, 189 is provided. An oil filter 190 of any conventional design is employed to remove particulate matter from the lubricating oil/hydraulic fluid.

Figure 7:
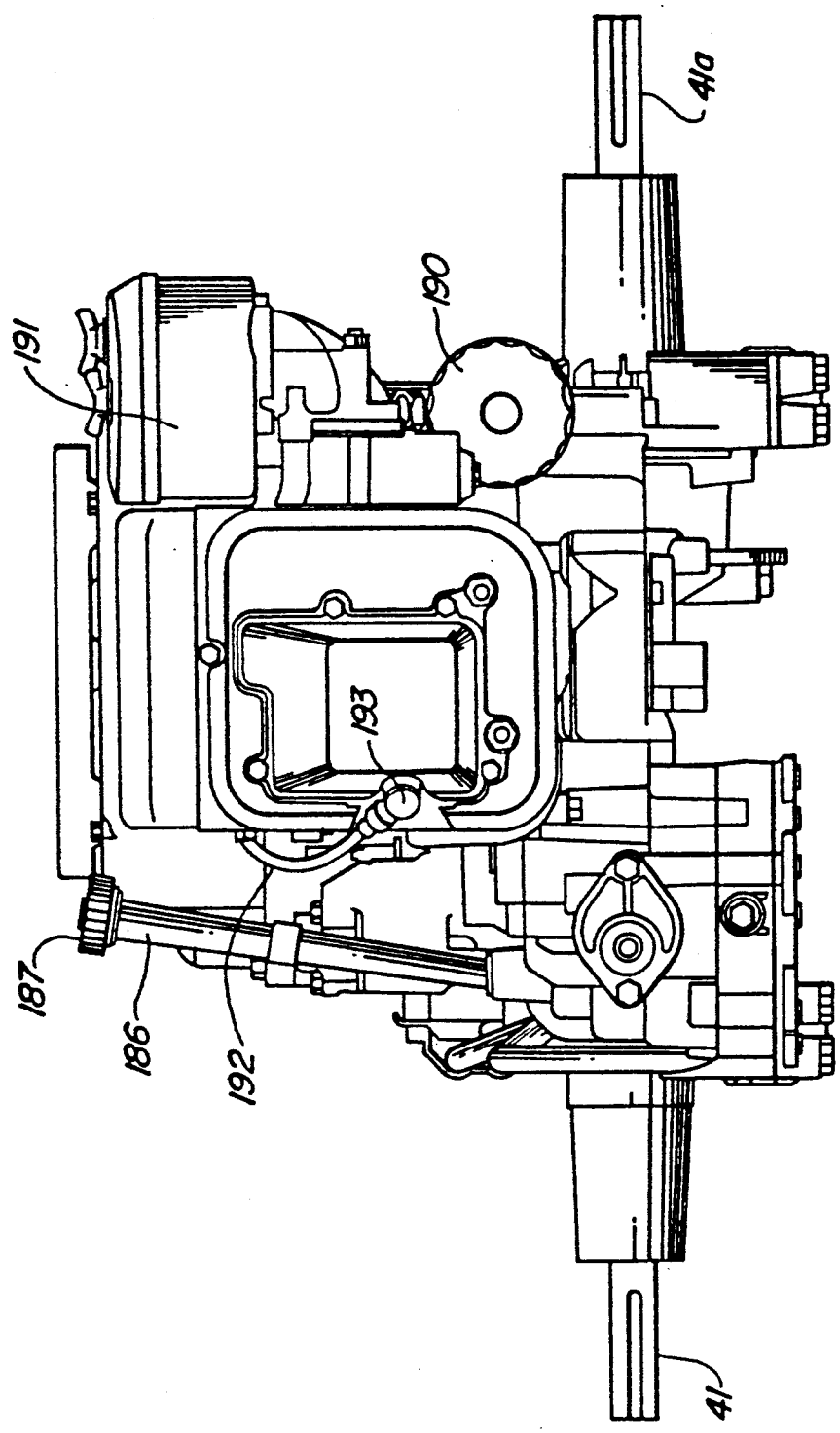
FIG. 7 is a rear view of the second embodiment.
Figure 11:
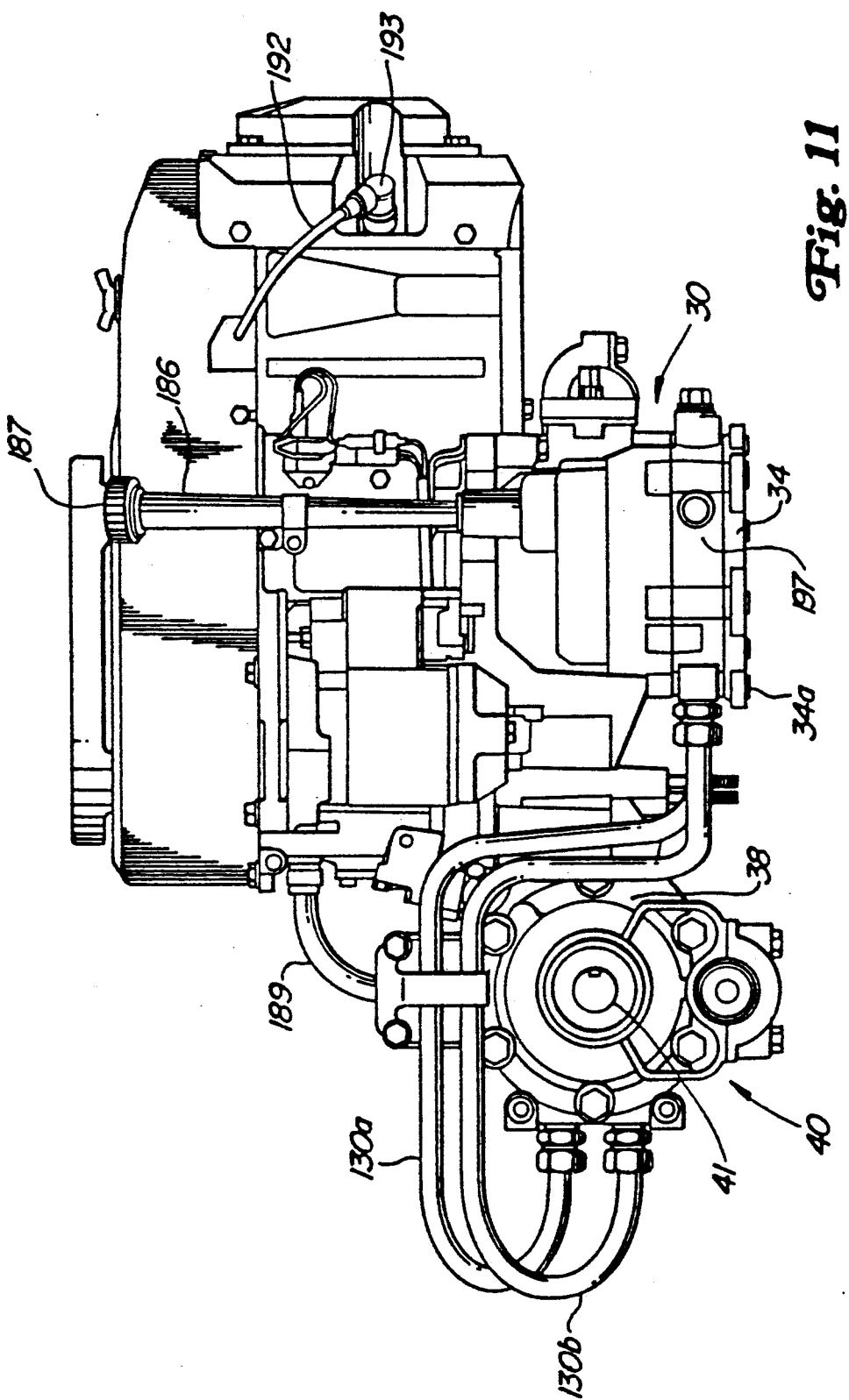
FIG. 11 is a left side view of the second embodiment.

An air cleaner 191 is provided to filter particulate matter from the air required for the fuel system, which typically employs a carburetor (not shown) of known design, and a fuel pump 194, although in some instances it may be preferred to employ a gravity feed system. As previously noted, various engine types and configurations may be employed, however, the preferred engine design is a carbureted, gasoline-powered engine. With such carbureted system, any conventional ignition system may be employed and a high tension cable 192 and spark plug cap 193 electrically connected to a spark plug (not shown) are illustrated in FIGS. 7 and 11.

Figure 9:
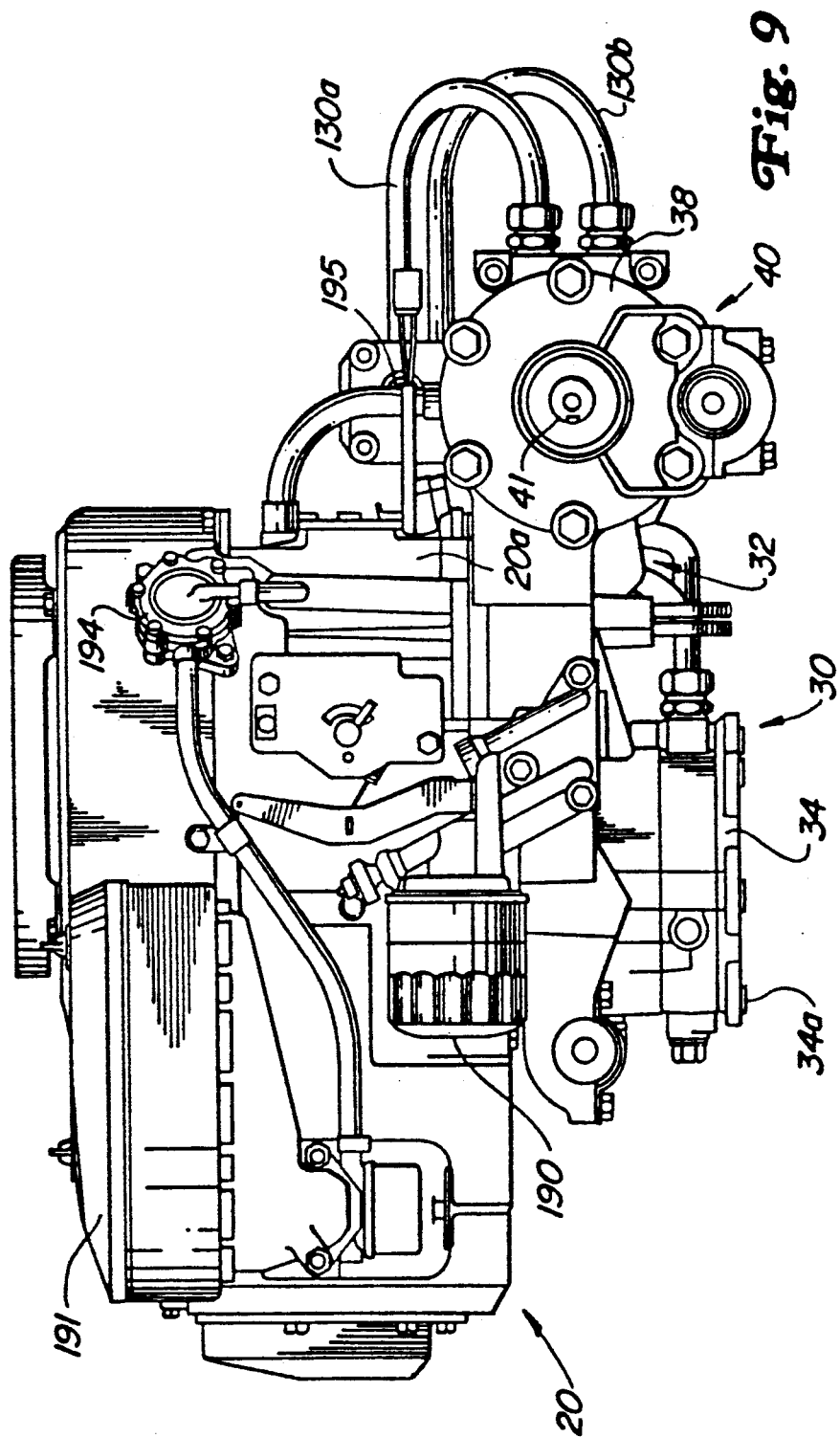
FIG. 9 is a right side view of the second embodiment.
Figure 10:
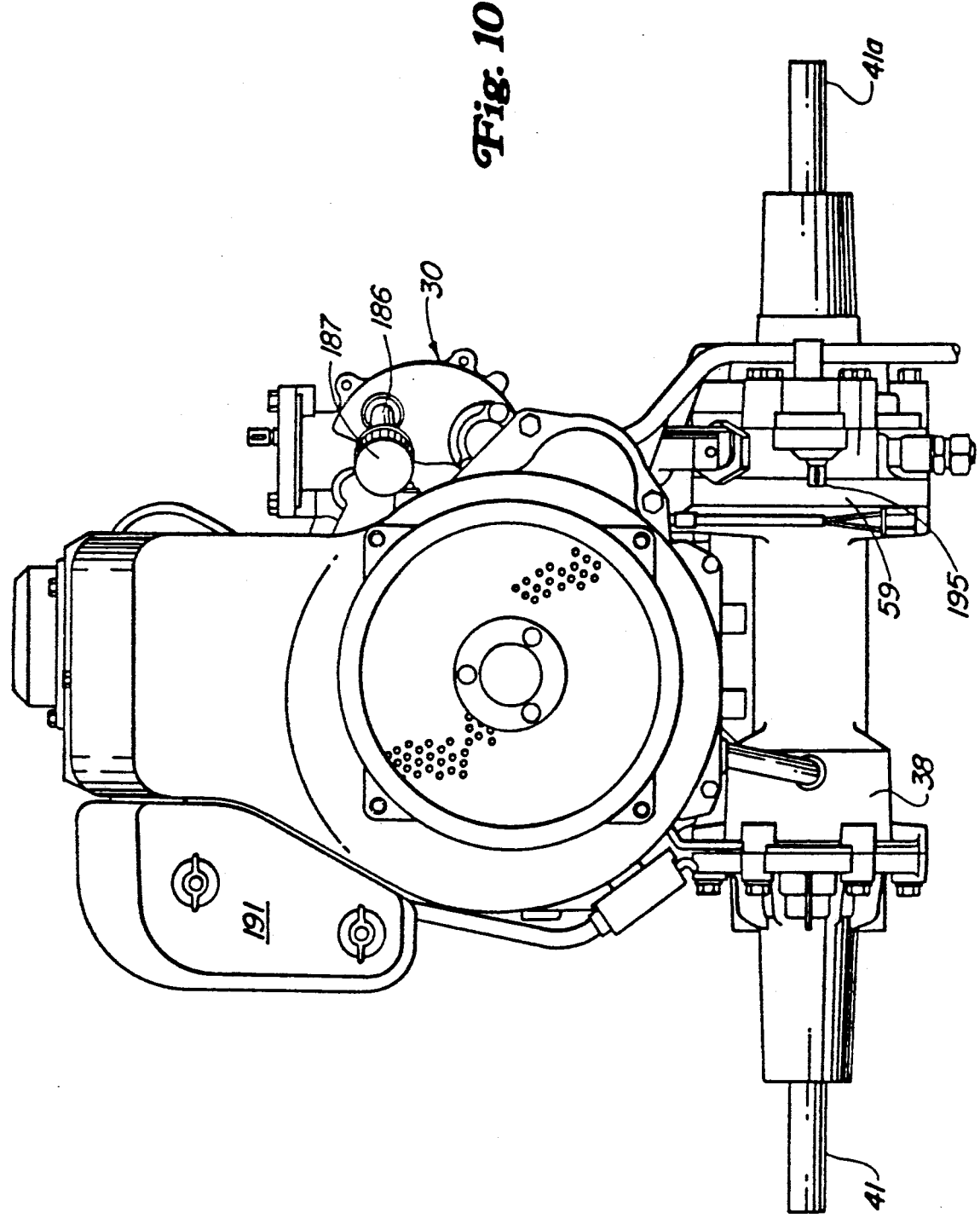
FIG. 10 is a top view of the second embodiment.

The second illustrated embodiment of the invention employs a parking brake system which is operatively associated with an output shaft that is operatively connected to the separated shafts 41. FIGS. 9 and 10 illustrate a parking brake shaft 195 for controlling the parking brake system.

FIG. 8 shows the exhaust port 196 and a control shaft 149 for an adjustment rod of the hydraulic pump.

In conclusion, according to the power system of the present invention (and referring to FIGS. 2 and 5), there are provided a housing 32 integrally connected to the engine body and encasing the output shaft portion 28 (driving shaft) of the crankshaft and the separated shafts 41 (driven shafts); a variable hydraulic pump 30, which can be adjustably controlled to adjust an amount of oil discharged therefrom by an operation from outside of the power system, connected to the output shaft portion 28 and encased by the pump cover 34 which is a part of the housing 32; the driving axle arrangement, which is constituted by the crescent hydraulic motor 40 for converting the oil pressure from the variable hydraulic pump 30 into driving power, the planetary gear reduction 55 for decreasing or reducing the output of the hydraulic motor 40, and the differential gear 56 for transmitting the reduced driving speed from the gear reduction 55 to the separated shafts 41 extending transversely of the vehicle, connected to said separated shafts and encased by the axle housing 38 which is also a part of the housing 32; and the working oil passages 42, 44 for communicating the variable hydraulic pump 30 with the crescent hydraulic motor 40, which are formed in the wall of the lower casing 36 which is also a part of the housing 32.

With the construction as mentioned above, since the axle housing 38 is fixedly connected to the lower casing 36 and to the crankcase 20a and since the pump cover 34 encasing the variable hydraulic pump 30 is also fixedly connected to the lower casing 36, even when the axle housing 38 is floatingly supported by the elastic insulators (FIG. 5), the engine 20 and the variable hydraulic pump 30 can be moved together with the axle housing 38 as a body.

Accordingly, in the present invention, there is no need for providing the V-shaped belt 12 for transmitting the power from the engine 10 to the transaxle 16 as in the case of the transmission shown in FIG. 1; on the contrary, according to the present invention, the power from the engine 20 can be converted into hydraulic pressure by the variable hydraulic pump 30. The hydraulic pressure can be transmitted, through the working oil passages 42 and 44, to the crescent hydraulic motor 40 (FIG. 5) wherein the hydraulic pressure can be converted into driving speed or driving force. The driving power from the crescent hydraulic motor 40 can be decreased or reduced by the planetary gear reduction 55 and then be transmitted to the separated shafts 41 through the differential gear 56.

Further, since the driving axle arrangement constituted by the hydraulic motor 40, the planetary gear reduction 55, the differential gear 56, the brake 57, and the like is accommodated into the axle housing 38 as a unit, the axle housing 38 itself can be compact, and the driving axle arrangement can easily be mounted on a small-sized vehicle such as that shown in FIG. 2.

While the form of apparatus herein described constitutes preferred embodiments of this invention, it is to be understood that the invention is not limited to these precise forms of apparatus and that changes may be made therein without departing from the scope of the invention which is defined in the appended claims.

We claim:

1. A unitized power system for a small vehicle comprising:
   (a) an engine having a crankshaft;
   (b) a drive train operatively connected to said engine, said drive train including
      a variable speed transmission including a variable hydraulic pump operatively connected to output means associated with the crankshaft of the engine and to an hydraulic motor, and
      a driving axle arrangement; and
   (c) a housing enclosing said drive train and at least a portion of said engine, said housing comprising a lower casing portion fixedly connected to a crankcase of the engine, a pump cover portion for encasing said variable hydraulic pump, and an axle housing portion for encasing said driving axle arrangement, said portions being fixedly connected to each other to form a unitary body.

2. A unitized power system according to claim 1 wherein said variable speed transmission comprises a hydro-static transmission.

3. A unitized power system according to claim 1 wherein said variable speed transmission comprises a continuously variable transmission.

4. A unitized power system according to claim 1 wherein said output means comprises an output end portion of the crankshaft.

5. A unitized power system according to claim 1 wherein said output means comprises the camshaft.

6. A unitized power system according to claim 1 wherein said hydraulic motor comprises a crescent hydraulic motor.

7. A unitized power system according to claim 1 wherein said variable hydraulic pump is adjustable to control the discharge of a varying amount of hydraulic fluid to said hydraulic motor.

8. A unitized power system according to claim 1 wherein said driving axle arrangement comprises:
   a reduction gear operatively associated with said hydraulic motor,
   driven shafts comprising separated shafts extending transversely of the vehicle, and
   a differential gear located intermediate and operatively associated with said reduction gear and said separated shafts.

9. A unitized power system according to claim 8 wherein said hydraulic motor is a crescent hydraulic motor and said reduction gear is a planetary reduction gear, and wherein said driving axle arrangement comprises said differential gear operatively connected to said separated shafts, and said crescent hydraulic motor and said planetary reduction gear are both arranged coaxial with respect to said separated shafts.

10. A unitized power system according to claim 8 further including a vehicular braking system operatively associated with said driven shafts.

11. A unitized power system according to claim 1 wherein said variable hydraulic pump comprises a substantially cylindrical cylinder block having a plurality of radially extending oil chambers and being mounted on an intermediate portion of said output end portion of the crankshaft for rotation therewith, a plurality of ball pistons slidably arranged in the corresponding oil chambers and shiftable radially of said cylinder block, and a cam ring which can be adjusted by rocking it around said output shaft from outside to adjust the degree of movement of said ball pistons in the corresponding oil chambers, thereby adjusting an amount of working oil discharged from said variable hydraulic pump.

12. A unitized power system according to claim 1 further comprising a common sump for providing lubricating oil to at least one of said engine and said driving axle arrangement and also to supply oil as a hydraulic fluid to said hydraulic pump and to said hydraulic motor.

13. A unitized power system according to claim 1 wherein said housing includes a motor housing.

14. A unitized power system according to claim 1 further comprising oil passages operatively communicating within said housing between said hydraulic pump and said hydraulic motor.

15. A unitized power system according to claim 1 further comprising oil passage conduits external of said housing for communicating between said hydraulic pump and said hydraulic motor.

16. A unitized power system according to claim 1, further comprising rubber insulators operatively connected to said housing and adapted to be operatively connected to a chassis of a vehicle.

17. A unitized power system according to claim 1 wherein said engine and said drive train have a common fluid reservoir.

18. An off road vehicle comprising:
   a vehicle body having a unitized power system mounted thereon comprising:
   (a) an engine having a crankshaft;
   (b) a drive train operatively connected to said engine, said drive train including
      a variable speed transmission including a variable hydraulic pump operatively connected to the output end portion of the crankshaft of the engine and to an hydraulic motor, and
      a driving axle arrangement; and
   (c) a housing enclosing said drive train and at least a portion of said engine, said housing comprising a lower casing portion fixedly connected to a crankcase of the engine, a pump cover portion for encasing said variable hydraulic pump, and an axle housing portion for encasing said driving axle arrangement, said portions being fixedly connected to each other to form a unitary body.

19. An off road vehicle according to claim 18 wherein said transmission is a hydro-static transmission.

20. An off road vehicle according to claim 18 wherein said variable speed transmission comprises a continuously variable transmission.

21. An off road vehicle according to claim 18 wherein said output means comprises an output end portion of the crankshaft.

22. An off road vehicle according to claim 18 wherein said output means comprises the camshaft.

23. An off road vehicle according to claim 18 wherein said hydraulic motor is a crescent hydraulic motor.

24. An off road vehicle according to claim 18 wherein said variable hydraulic pump is adjustable to control the discharge of a varying amount of hydraulic fluid to said hydraulic motor.

25. An off road vehicle according to claim 18 wherein said driving axle arrangement comprises:

a reduction gear operatively associated with said hydraulic motor, driven shafts comprising separated shafts extending transversely of the vehicle, and a differential gear located intermediate and operatively associated with said reduction gear and said separated shaft.

26. An off road vehicle according to claim 25 wherein said hydraulic motor is a crescent hydraulic motor and said reduction hear is a planetary reduction gear, and wherein said driving axle arrangement is constituted by the differential gear operatively connected to said separated shafts, and said crescent hydraulic motor and said planetary reduction gear are both arranged coaxial with respect to said separated shafts.

27. An off road vehicle according to claim 32 further including a vehicular braking system operatively associated with said driven shafts.

28. An off road vehicle according to claim 18 wherein said variable hydraulic pump comprises a substantially cylindrical cylinder block having a plurality of radially extending oil chambers and being mounted on an intermediate portion of said output end portion of the crankshaft for rotation therewith, a plurality of ball pistons slidably arranged in the corresponding oil chambers and shiftable radially of said cylinder block, and a cam ring which can be adjusted by rocking it around said output shaft from outside to adjust the degree of movement of said ball pistons in the corresponding oil chambers, thereby adjusting an amount of working oil discharged from said variable hydraulic pump.

29. An off road vehicle according to claim 18 wherein a common sump is provided as a source of lubricating oil for at least one of said engine and said driving axle arrangement and is also used to supply oil as a hydraulic fluid to said hydraulic pump and to said hydraulic motor.

30. An off road vehicle according to claim 18 wherein said housing includes a motor housing.

31. An off road vehicle according to claim 18 further comprising oil passages operatively communicating within said housing between said hydraulic pump and said hydraulic motor.

32. An off road vehicle according to claim 18 further comprising oil passage conduits external of said housing for communicating between said hydraulic pump and said hydraulic motor.

33. An off road vehicle according to claim 18 further comprising rubber insulators operatively connected to said housing and operatively connected to a chassis of the vehicle.

34. An off road vehicle according to claim 18 wherein said engine and said drive train have a common fluid reservoir.

35. A variable speed transmission for transmitting power from an output end of the crankshaft of an engine mounted on a vehicle to driven shafts arranged transversely of the vehicle, comprising:

a housing means fixedly connected to a body of the engine and encasing said output end of the crankshaft of the engine and said driven shafts;

a variable hydraulic pump which can be adjustably controlled to adjust an amount of fluid discharged therefrom by an operation external to said pump, said variable hydraulic pump being connected to said output end of the crankshaft of the engine and being encased by said housing means; and a driving axle arrangement constituted by a hydraulic motor for converting hydraulic pressure from said variable hydraulic pump into driving power, a reduction gear for effecting a reduction in speed of said hydraulic motor, a differential gear for transmitting the reduced speed effected by said reduction gear to separated shafts which form said driven shafts and extend transversely of the vehicle, said driving axle arrangement being connected to said separated shafts and being encased by said housing means.

36. A variable speed transmission according to claim 35 wherein said variable hydraulic pump comprises a substantially cylindrical cylinder block having a plurality of radially extending oil chambers and being mounted on an intermediate portion of said output end portion of the crankshaft for rotation therewith, a plurality of ball pistons slidably arranged in the corresponding oil chambers and shiftable radially of said cylinder block, and a cam ring which can be adjusted by rocking it around said output shaft from outside to adjust the degree of movement of said ball pistons in the corresponding oil chambers, thereby adjusting an amount of working oil discharged from said variable hydraulic pump.

37. A variable speed transmission according to claim 35 wherein said hydraulic motor is a crescent hydraulic motor and said reduction gear is a planetary reduction gear, and wherein said driving axle arrangement is constituted by the differential gear connected to said separated shafts, and said crescent hydraulic motor and said planetary reduction gear are both arranged coaxial with said separated shafts.

38. A variable speed transmission according to claim 35 wherein a single sump is provided as a source of lubricating oil for at least one of said engine and said driving axle arrangement and is also used to supply oil as an hydraulic fluid to said hydraulic pump and to said hydraulic motor.

39. A variable speed transmission according to claim 35 wherein said housing comprises a lower casing portion fixedly connected to a crankcase of the engine, a pump cover portion for encasing said variable hydraulic pump, and an axle housing portion for encasing said driving axle arrangement, said portions being fixedly connected to each other to form a unitary body.

40. A power system comprising:
(a) an engine having a crankshaft;
(b) a drive train operatively connected to said engine, said drive train including a variable speed transmission operatively connected to a driving axle arrangement; and
(c) a common fluid reservoir, operatively connected to said engine and said drive train, for supplying fluid to said engine and to at least one of said driving axle arrangement and said variable speed transmission.

41. The power system of claim 40 wherein said variable speed transmission comprises an hydraulic pump and an hydraulic motor.

42. The power system of claim 41 wherein said common fluid reservoir supplies fluid to at least one of said engine and said driving axle arrangement and also provides fluid to said hydraulic pump and to said hydraulic motor.

43. The power system of claim 41 wherein said common fluid reservoir supplies fluid to said engine, said hydraulic pump, and said hydraulic motor.

44. The power system of claim 43 wherein said common fluid reservoir also supplies fluid to said driving axle arrangement.

45. A unitized power system for a small engine-powered vehicle, the engine having an output shaft and the vehicle having a drive train with driven shafts, comprising:
- a housing fixedly connected to a body of said engine and encasing said output shaft of the engine and said driven shafts;
- a variable hydraulic pump which can be adjustably controlled to adjust an amount of fluid discharged therefrom by an operation external to said pump, said variable hydraulic pump being connected to said output shaft of the engine and being encased by said housing; and
- a driving axle arrangement constituted by a hydraulic motor for converting hydraulic pressure from said variable hydraulic pump into driving power, a reduction gear for reducing said driving power from said hydraulic motor, a differential gear for transmitting the reduced driving power from said reduction gear to separated shafts which form said driven shafts and extend transversely of the vehicle, said driving axle arrangement being connected to said separated shafts and being encased by said housing.

46. An off road vehicle comprising:
a vehicle body having a unitized power system mounted thereon, the power system including an engine and drive train, the engine having an output shaft and the drive train having driven shafts, comprising:
(a) a housing fixedly connected to a body of said engine and encasing said output shaft of the engine and said driven shafts;
(b) a variable hydraulic pump which can be adjustably controlled to adjust an amount of fluid discharged therefrom by an operation external to said pump, said variable hydraulic pump being connected to said output shaft of the engine and being encased by said housing; and
(c) a driving axle arrangement constituted by a hydraulic motor for converting hydraulic pressure from said variable hydraulic pump into driving power, a reduction hear for reducing said driving power from said hydraulic motor, a differential gear for transmitting the reduced driving power from said reduction gear to separated shafts which form said driven shafts and extend transversely of the vehicle, said driving axle arrangement being connected to said separated shafts and being encased by said housing.

* * * * *

UNITED STATES PATENT AND TRADEMARK OFFICE
CERTIFICATE OF CORRECTION

PATENT NO. : 5,067,933
DATED : November 26, 1991
INVENTOR(S) : Hardesty et al.

It is certified that error appears in the above-indentified patent and that said Letters Patent is hereby corrected as shown below:

ON THE TITLE PAGE:

Item No. [57], Abstract, line 16, change "reducing the driving power" to --effecting a reduction in speed--.

Claim 26, column 13, line 10, change "hear" to --gear--.

Claim 27, column 13, line 16, change "32" to --25--.

Claim 46, column 16, line 19, change "hear" to --gear--.

Signed and Sealed this

Twenty-first Day of March, 1995

Attest:

BRUCE LEHMAN

*Attesting Officer*     *Commissioner of Patents and Trademarks*